(12) United States Patent
Zheng et al.

(10) Patent No.: US 9,385,582 B2
(45) Date of Patent: Jul. 5, 2016

(54) METHOD AND APPARATUS FOR CONTROLLING LOW VOLTAGE RIDE THROUGH OF PHOTOVOLTAIC GRID-CONNECTED INVERTER

(71) Applicants: BOE TECHNOLOGY GROUP CO., LTD., Beijing (CN); BEIJING BOE ENERGY TECHNOLOGY CO., LTD., Beijing (CN)

(72) Inventors: Ping Zheng, Beijing (CN); Hangbin Song, Beijing (CN); Xiaoyan Han, Beijing (CN)

(73) Assignees: BOE TECHNOLOGY GROUP CO., LTD., Beijing (CN); BEIJING BOE ENERGY TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 14/366,221

(22) PCT Filed: Jun. 27, 2013

(86) PCT No.: PCT/CN2013/078208
§ 371 (c)(1),
(2) Date: Jun. 17, 2014

(87) PCT Pub. No.: WO2014/173002
PCT Pub. Date: Oct. 30, 2014

(65) Prior Publication Data
US 2015/0188401 A1  Jul. 2, 2015

(30) Foreign Application Priority Data

Apr. 27, 2013  (CN) .......................... 2013 1 0153301

(51) Int. Cl.
*H02M 1/00* (2006.01)
*H02M 1/36* (2007.01)
(Continued)

(52) U.S. Cl.
CPC ............... *H02M 1/00* (2013.01); *H02J 3/1814* (2013.01); *H02J 3/385* (2013.01); *H02M 1/36* (2013.01);
(Continued)

(58) Field of Classification Search
CPC   Y02E 10/563; H02J 3/38; H02M 2001/0003; H02M 1/36; H02M 7/44; H02M 1/00
USPC .................................. 363/16, 36, 95, 97, 131
See application file for complete search history.

(56) References Cited

U.S. PATENT DOCUMENTS

2012/0181871 A1 *  7/2012  Johansen et al. ................ 307/66
2014/0112039 A1 *  4/2014  Correa Vasquez et al. ..... 363/98
(Continued)

FOREIGN PATENT DOCUMENTS

CN          102170142 A  *  8/2011
CN          102801183 A     11/2012

OTHER PUBLICATIONS

Bo Chen et al; "Strategy for reactive control in low voltage ride through of photovoltaic power station", Power Systems Protection and Control vol. 40 No. 70, Sep. 1, 2012, pp. 7-12.
(Continued)

*Primary Examiner* — Adolf Berhane
*Assistant Examiner* — Sisay G Tiku
(74) *Attorney, Agent, or Firm* — Ladas & Parry LLP

(57) ABSTRACT

A method and an apparatus for controlling a Low Voltage Ride Through of a photovoltaic grid-connected inverter. The method for controlling comprises: judging whether a voltage value of a grid is smaller than an upper limit of a low voltage value and is not greater than a lower limit of the low voltage value; when it is judged that a root mean square value of the voltage in the grid is smaller than the upper limit of the low voltage value and greater than the lower limit of the low voltage value, controlling an active current value outputted from the inverter to be equal to a target active current value and controlling a reactive current value outputted to be equal to a target reactive current value, so that a comparison difference between a total current outputted by the inverter in a Low Voltage Ride Through state and a current outputted by the inverter in a normal state is smaller than a preset value. The method and apparatus settle problem that the poor stability is caused since control on the waveform and amplitude of the current is ignored in the Low Voltage Ride Through control on the inverter, such that the total current changes slightly before and after a voltage dip, which can support and stabilize the grid.

12 Claims, 2 Drawing Sheets

(51) Int. Cl.
  *H02J 3/38* (2006.01)
  *H02M 7/44* (2006.01)
  *H02J 3/18* (2006.01)

(52) U.S. Cl.
  CPC ........ *H02M 7/44* (2013.01); *H02M 2001/0003* (2013.01); *Y02E 10/58* (2013.01); *Y02E 40/18* (2013.01)

(56) References Cited

U.S. PATENT DOCUMENTS

2014/0117917 A1* 5/2014 Takeda et al. ............... 318/519
2015/0137520 A1* 5/2015 Garcia ........................... 290/44

OTHER PUBLICATIONS

First Chinese Office Action Appln. 201310153301.3 ; Dated Oct. 8, 2014.
Jingbao Wang, et al; "Grid-Connected Photovoltaic inverter and its Low Voltage Ride-Through Technology", Low voltage eletrical equipment, vol. 17, pp. 26-30; Dec. 31, 2012.
Second Chinese Office Action dated Mar. 4, 2015, Appln. No. 201310153301.3.
International Search Report mailed Feb. 20, 2014; PCT/CN2013/078208.
Third Chinese Office Action dated Aug. 18, 2015; Appln No. 201310153301.3.
International Preliminary Report on Patentability issued Oct. 27, 2015; PCT/CN2013/078208.

* cited by examiner

US 9,385,582 B2

METHOD AND APPARATUS FOR CONTROLLING LOW VOLTAGE RIDE THROUGH OF PHOTOVOLTAIC GRID-CONNECTED INVERTER

TECHNICAL FIELD

The present disclosure relates to a technical field of power control, and more particularly to a method and an apparatus for controlling a Low Voltage Ride Through of a photovoltaic grid-connected inverter.

BACKGROUND

A grid-connected photovoltaic (PV) system refers to a power network incorporating a solar energy battery array or a photovoltaic power station into a grid so as to realize power supply. A Low Voltage Ride Through (LVRT) refers to a case as follows: when a voltage dip occurs in the power network of the grid-connected PV system, a DC (direct-current) side, such as the photovoltaic power station, can remains a connection with the grid at an AC (alternating current) side, a DC voltage from the DC side is converted into an AC voltage for the grid at the AC side by an inverter(s) until the malfunction in the grid is removed, so that a voltage dip period is ridden through, such that the malfunction in the grid can be prevented from expanding and the reliability of the power supply can be enhanced. The voltage dip refers to a sudden event of which a duration is extremely short and during which a Root Mean Square (RMS) value of the voltage on a bus bar decreases sharply and rapidly.

When a power supply proportion of the photovoltaic power station or the solar energy battery array is high in the power network and their penetration rate is also high, if the photovoltaic power station is split in a passive protection manner by which the photovoltaic power station is removed immediately from the power supply network as the voltage dip occurs, an active power generation would decrease greatly, such that the power supply system is difficult to be recovered, and even splitting of other units may be caused, which may lead to a power cut in a large scale and expand malfunctions. In this case, an ability of Low Voltage Ride Through is necessary.

In existing method and apparatus for controlling the Low Voltage Ride Through of the photovoltaic grid-connected inverter, controlling for an output current of the inverter is ignored, such that problems that distortions caused by fluctuations in the current are serious and quality of the outputted electric energy is affected severely when the voltage dips rapidly, therefore the existing method and apparatus for controlling the Low Voltage Ride Through of the photovoltaic grid-connected inverter are required to be further optimized and improved.

SUMMARY

Object of Invention

The present disclosure directs to provide a method and an apparatus for controlling a Low Voltage Ride Through of a photovoltaic grid-connected inverter, which have a current with a smaller fluctuation outputted from the DC side at a grid-connected photovoltaic system, a high Low Voltage Ride Through capability and a high system stability as the voltage dips.

Technical Solutions

In view of this, in embodiments of the present disclosure, there is provided a method for controlling a Low Voltage Ride Through of a photovoltaic grid-connected inverter. The method comprises steps of: judging whether a root mean square (RMS) value of a voltage in a grid is lower than an upper limit of a low voltage value; controlling the inverter to operate normally when it is judged that the root mean square value of the voltage in the grid is not lower than the upper limit of the low voltage value; and judging whether the root mean square value of the voltage in the grid is lower than a lower limit of the low voltage value when it is judged that the root mean square value of the voltage in the grid is lower than the upper limit of the low voltage value, controlling the inverter to stop operating when it is judged that the root mean square value of the voltage in the grid is lower than the lower limit of the low voltage value, and controlling an active current value outputted from the inverter to be equal to a target active current value and a reactive current value outputted from the inverter to be equal to a target reactive current value when it is judged that the root mean square value of the voltage in the grid is not lower than the lower limit of the low voltage value, wherein a comparison difference between a total current outputted by the inverter in a Low Voltage Ride Through state and a current outputted in a normal state is smaller than a preset value.

In an example, the method for controlling the Low Voltage Ride Through of the photovoltaic grid-connected inverter further comprises: timing a duration during which the root mean square value of the voltage in the grid is not lower than the lower limit of the low voltage value and judging whether the root mean square value of the voltage in the grid is equal to the lower limit of the low voltage value when it is judged that the root mean square value of the voltage in the grid is lower than the upper limit of the low voltage value; judging whether the duration reaches a preset period of time T1 when it is judged that the root mean square value of the voltage in the grid is equal to the lower limit of the low voltage, controlling the inverter to stop operating when it is judged that the duration reaches the preset period of time T1, and controlling the active current value outputted from the inverter to be equal to the target active current value and the reactive current value outputted from the inverter to be equal to the target reactive current value when it is judged that the duration does not reach the preset period of time T1; and judging whether the duration reaches a preset period of time T2 when it is judged that the root mean square value of the voltage in the grid is not equal to the lower limit of the low voltage, controlling the inverter to stop operating when it is judged that the duration reaches the preset period of time T2, and controlling the active current value outputted from the inverter to be equal to the target active current value and the reactive current value outputted from the inverter to be equal to the target reactive current value when it is judged that the duration does not reach the preset period of time T2.

In an example, the method for controlling the Low Voltage Ride Through of the photovoltaic grid-connected inverter further comprises: collecting a voltage signal and a current signal at a DC side and collecting voltage signals and current signals of the grid at an AC side.

In an example, when it is judged that the root mean square value of the voltage in the grid is not lower than the upper limit of the low voltage value, the active current value outputted from the inverter normally is controlled to be equal to a target current value in a normal state obtained with a MPPT algorithm and a voltage PI control according to the collected signals, and the reactive current voltage outputted from the inverter is controlled to be zero.

In an example, the method for controlling the Low Voltage Ride Through of the photovoltaic grid-connected inverter further comprises: acquiring the target active current value and the target reactive current value in the Low Voltage Ride Through state, the target active current value $i^*_d$ is a preset active current value $i_d'$ outputted from the inverter as the gird operates normally, and the target reactive current value $i^*_q$ is $i^*_q = \sqrt{(n^2-1)} \times i'_d$, wherein n is a preset variation amplitude of a total current outputted from the inverter.

Additionally, in the embodiments of the present disclosure, there is further provided an apparatus for controlling a Low Voltage Ride Through of a photovoltaic grid-connected inverter. The apparatus comprises a control unit. The control unit judges whether a root mean square (RMS) value of a voltage in a grid is lower than an upper limit of a low voltage value; the control unit controls the inverter to operate normally when it is judged that the root mean square value of the voltage in the grid is not lower than the upper limit of the low voltage value. The control unit judges whether the root mean square value of the voltage in the grid is lower than a lower limit of the low voltage value when it is judged that the root mean square value of the voltage in the grid is lower than the upper limit of the low voltage value, controls the inverter to stop operating when it is judged that the root mean square value of the voltage in the grid is lower than the lower limit of the low voltage value, and controls an active current value outputted from the inverter to be equal to a target active current value and a reactive current value outputted from the inverter to be equal to a target reactive current value when it is judged that the root mean square value of the voltage in the grid is not lower than the lower limit of the low voltage value, wherein a comparison difference between a total current outputted by the inverter in a Low Voltage Ride Through state and a current outputted in a normal state is smaller than a preset value.

In an example, the apparatus for controlling the Low Voltage Ride Through of the photovoltaic grid-connected inverter further comprises a timing unit. When it is judged that the root mean square value of the voltage in the grid is lower than the upper limit of the low voltage, the timing unit times a duration during which the root mean square value of the voltage in the grid is not lower than the lower limit of the low voltage value, and the control unit judges whether the root mean square value of the voltage in the grid is equal to the lower limit of the low voltage value. When it is judged that the root mean square value of the voltage in the grid is equal to the lower limit of the low voltage value, the control unit judges whether the duration reaches a preset period of time T1, controls the inverter to stop operating when it is judged that the duration reaches the preset period of time T1, and controls the active current value outputted from the inverter to be equal to the target active current value and the reactive current value outputted from the inverter to be equal to the target reactive current value when it is judged that the duration does not reach the preset period of time T1. When it is judged that the root mean square value of the voltage in the grid is not equal to the lower limit of the low voltage value, the control unit judges whether the duration reaches a preset period of time T2, controls the inverter to stop operating when it is judged that the duration reaches the preset period of time T2, and controls the active current value outputted from the inverter to be equal to the target active current value and the reactive current value outputted from the inverter to be equal to the target reactive current value when it is judged that the duration does not reach the preset period of time T2.

In an example, the apparatus for controlling the Low Voltage Ride Through of the photovoltaic grid-connected inverter further comprises a sampling unit. The sampling unit comprises a DC sampling module for collecting a voltage signal and a current signal at a DC side and an AC sampling module for collecting voltage signals and current signals of the grid at an AC side. In an example, the control unit comprises a normal state control module, and when the root mean square value of the voltage in the grid is not lower than the upper limit of the low voltage value, the normal state control module controls the active current value outputted from the inverter normally to be equal to a target current value in the normal state obtained with a MPPT algorithm and a voltage PI control according to the collected signals and controls the reactive current voltage outputted from the inverter to be zero.

In an example, the apparatus for controlling the Low Voltage Ride Through of the photovoltaic grid-connected inverter further comprises a Low Voltage Ride Through state control module for acquiring the target active current value and the target reactive current value in the Low Voltage Ride Through state, the target active current value $i^*_d$ is a preset active current value $i_d'$ outputted from the inverter as the gird operates normally, the target reactive current value $i^*_q$ is $i^*_q = \sqrt{(n^2-1)} \times i'_d$, wherein n is a preset variation amplitude of a total current outputted from the inverter.

Benefit Effects

With the method and apparatus for controlling the Low Voltage Ride Through of the photovoltaic grid-connected inverter according to the embodiments of the present disclosure, when a voltage dip occurs, the total current outputted from the inverter is controlled to approach a current outputted in the normal state by performing reaction current compensation, therefore the fluctuation in the current is small and a distortion in the current is also small, so that the Low Voltage Ride Through capability at the DC side of the grid-connected photovoltaic system is enhanced. Therefore, both the stability and reliability of the grid can be improved, and in turn the phenomena that a power cut in a large scale and a grid shutdown are caused by splitting of other units resulting from the automatic splitting of a photovoltaic power supplying portion because of the voltage dip can be avoided.

DETAILED DESCRIPTION

Figure 1:
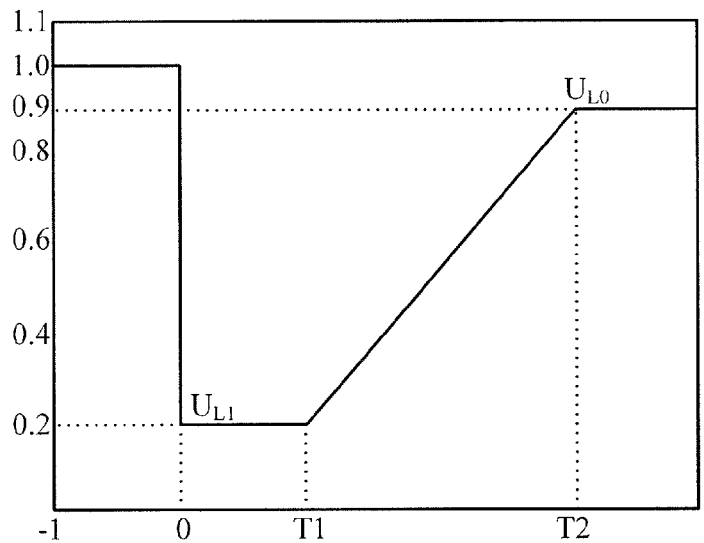
FIG. 1 is chart of a certification and detection standard specification for a photovoltaic grid-connected inverter.

A method and apparatus for controlling a Low Voltage Ride Through of a photovoltaic grid-connected inverter will be further described below in connection with drawings and embodiments.

Embodiment 1

Thereafter the method for controlling the Low Voltage Ride Through of the photovoltaic grid-connected inverter according to the embodiments of the present disclosure will be described.

At first, in step S1, it is judged whether a root mean square value of a voltage in a grid is lower than an upper limit of a low voltage value. Generally, the upper limit of the low voltage value may be selected as 0.9 times of a rated voltage.

When it is judged that the root mean square value of the voltage in the grid is not lower than the upper limit of the low voltage value in the step S1, the inverter is controlled to operate normally. If the root mean square value of the voltage in the grid is greater than or equal to the upper limit of the low voltage value, it is indicated that no voltage dip occurs in the grid-connected photovoltaic system and the grid-connected photovoltaic system is in a normal operation state, so the inverter may operate normally.

When it is judged that the root mean square value of the voltage in the grid is lower than the upper limit of the low voltage value in the step S1, the method for controlling the Low Voltage Ride Through of the photovoltaic grid-connected inverter according to the embodiments of the present disclosure goes to a step S2.

In the step S2, it is judged whether the root mean square value of the voltage in the grid is lower than a lower limit of the low voltage value. Generally, the lower limit of the low voltage value may be selected as 0.2 times of the rated voltage.

When it is judged that the root mean square value of the voltage in the grid is lower than the lower limit of the low voltage value in the step S2, the inverter is controlled to stop operating. Generally, if the root mean square value of the voltage at the grid side is too low, for example, lower than the lower limit of the low voltage value, the inverter is stopped operating and a photovoltaic power station is split from a power network. A typical method for stopping the inverter is to disconnect corresponding circuits directly by breakers, so that the inverter and the photovoltaic power station or solar battery(s) are removed from the power network.

When it is judged that the root mean square value of the voltage in the grid is not lower than the lower limit of the low voltage value in the step S2, an active current value outputted from the inverter is controlled to be equal to a target active current value and a reactive current value outputted from the inverter is controlled to be equal to a target reactive current value. The selecting of the target active current value and the target reactive current value varies according to different network parameters in the grid-connected photovoltaic system and different operation situations in the normal state. The target active current value and the target reactive current value may be selected suitably as long as a comparison difference between a total current outputted by the inverter in a Low Voltage Ride Through state and a current outputted in a normal state is smaller than a preset value.

When the root mean square value of the voltage in the grid is lower than the upper limit of the low voltage value and greater than or equal to the lower limit of the low voltage value, the photovoltaic power station or the solar battery array is needed to be maintained to ride through this low voltage period. In a traditional control method, it is ignored to maintain a waveform and amplitude of a current outputted from a transformer during a Low Voltage Ride Through period, while in the method for controlling the Low Voltage Ride Through of the photovoltaic grid-connected inverter according to the present embodiment, the active current value and the reactive current value outputted from the inverter is controlled. The reactive power is introduced to compensate a total power when the active power is too low, so that the current outputted from the inverter has a small distortion in the waveform and a small variation in the amplitude during the Low Voltage Ride Through period, thus a quality of electric energy is ensured and the stability and reliability of the grid-connected photovoltaic system are enhanced. Therefore, the phenomena that a power cut in a large scale and a malfunction expansion are caused by the automatic splitting of the photovoltaic power supplying portion because of the voltage dip can be avoided.

Embodiment 2

As illustrated in FIG. 1, "Technical Requirements and Test Methods for Photovoltaic Grid-Connected Specific Inverter CGC:2010", a Certification and Detection Standard for Photovoltaic Grid-Connected Inverter, specifies that the inverter of medium-high voltage type specially applied in a large scale photovoltaic power station should have a certain degree of capability for withstanding an abnormal voltage, so as to prevent itself from being removed when a voltage in the gird is abnormal and from leading to unstable in the power supply of the gird, and specifies requirements as follows:

$U_{L0}$ is a upper limit of the low voltage value as operating normally;

$U_{L1}$ is a lower limit of the low voltage value required to withstand;

T1 is a period of time during which the grid-connection is required to be maintained when the voltage dips to $U_{L1}$; and T2 is a period of time during which the grid-connection is required to be maintained when the voltage dips to $U_{L0}$.

Values of the $U_{L1}$, T1 and T2 are determined by taking actual situations such as a protection and reclosing action time and the like in consideration, generally the value of the $U_{L0}$ is 0.9 times of a rated voltage, the value of the $U_{L1}$ is 0.2 times of the rated voltage, the T1 is set to 1 S and the T2 is set to 2 S.

According to the above requirements, the method for controlling the Low Voltage Ride Through of the photovoltaic grid-connected inverter according to the present embodiment adds a step S3 on a basis of that according to the Embodiment 1.

Figure 2:
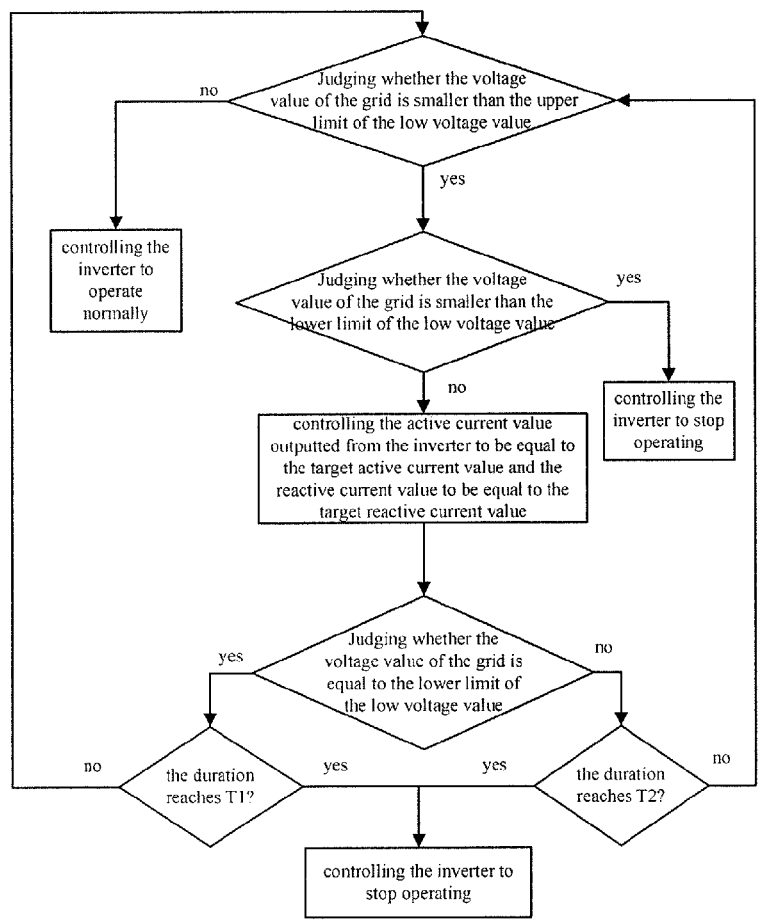
FIG. 2 is a flowchart for a method for controlling a Low Voltage Ride Through of a photovoltaic grid-connected inverter according to embodiments of the present disclosure.

The method for controlling the Low Voltage Ride Through of the photovoltaic grid-connected inverter according to the present embodiment will be described in connection with FIG. 2.

At first, in step S1, it is judged whether the root mean square value of the voltage in the grid is lower than the upper limit $U_{L0}$ of a low voltage value.

When it is judged that the root mean square value of the voltage in the grid is not lower than the upper limit of the low voltage value in the step S1, the inverter is controlled to operate normally.

When it is judged that the root mean square value of the voltage in the grid is lower than the upper limit of the low voltage value in the step S1, the method for controlling the Low Voltage Ride Through of the photovoltaic grid-connected inverter according to the present embodiment goes to a step S2.

In the step S2, it is judged whether the root mean square value of the voltage in the grid is lower than the lower limit $U_{L1}$ of the low voltage value.

When it is judged that the root mean square value of the voltage in the grid is lower than the lower limit of the low voltage value in the step S2, the inverter is controlled to stop operating.

When it is judged that the root mean square value of the voltage in the grid is not lower than the lower limit of the low voltage value in the step S2, the active current value outputted from the inverter is controlled to be equal to the target active current value and the reactive current value outputted from the inverter is controlled to be equal to the target reactive current value.

In the step S3, when it is judged that the root mean square value of the voltage in the grid is lower than the upper limit $U_{L0}$ of the low voltage value, a duration during which the root mean square value of the voltage in the grid is not lower than the lower limit $U_{L1}$ of the low voltage value is timed, and it is judged whether the root mean square value of the voltage in the grid is equal to the lower limit $U_{L1}$ of the low voltage value.

When it is judged that the root mean square value of the voltage in the grid is equal to the lower limit $U_{L1}$ of the low voltage value, it is judged whether the duration reaches the T1. In the present embodiment, a value of the T1 is as shown in FIG. 1 and is generally 1 second (1 s). The inverter is controlled to stop operating when it is judged that the duration reaches the T1. In this present embodiment, if the duration during which the voltage value of the grid is equal to the lower limit $U_{L1}$ of the low voltage value reaches the 1 s, the inverter is disconnected from the grid by devices such as the breakers in order that the photovoltaic power supplying portion of the grid-connected photovoltaic system is separated from the grid.

Further, when it is judged that the duration does not reach the T1, the active current value outputted from the inverter is controlled to be equal to the target active current value and the reactive current value outputted from the inverter is controlled to be equal to the target reactive current value, and the process returns to the step S1. That is to say, if the duration does not reach 1 s, the judging and timing processes are repeated starting from the step S1.

When it is judged that the root mean square value of the voltage in the grid is not equal to the lower limit $U_{L1}$ of the low voltage value, it is further judged whether the duration reaches the T2. In the present embodiment, a value of the T2 is as shown in FIG. 1 and is generally 2 s. That is to say, the ride through period may be 2 s if the root mean square value of the voltage in the grid is lower than the upper limit of the low voltage value and greater than the lower limit of the low voltage value.

If the duration has reached the T2, the inverter is controlled to stop operating. If the duration is shorter than the T2, the active current value outputted from the inverter is controlled to be equal to the target active current value and the reactive current value outputted from the inverter is controlled to be equal to the target reactive current value. Then, the process returns to the step S1, that is, the judging and timing operations are repeated starting from the step S1.

In the method for controlling the Low Voltage Ride Through of the photovoltaic grid-connected inverter according to the present embodiment, a comparison difference between the total current outputted by the inverter in the Low Voltage Ride Through state and the current outputted in the normal state is smaller than a preset value.

In the present embodiment, not only the small distortion in the current and the high output quality of the electric energy are ensured during the Low Voltage Ride Through, but also the voltage dip phenomenon is timed, so that the photovoltaic power supplying portion of the grid-connected photovoltaic system can be separated from the grid at the AC side in time, which can reduce waste of power.

Embodiment 3

On the basis of any one of the two embodiments described above, a method for controlling a Low Voltage Ride Through of a photovoltaic grid-connected inverter according to the present embodiment further comprises a step S0 for collecting a voltage signal and a current signal at a DC side and collecting voltage signals and current signals of the grid at an AC side.

When it is judged that the root mean square value of the voltage in the grid is not lower than the upper limit of the low voltage value in the step S1, the active current value outputted from the inverter normally is controlled to be equal to a target current value in the normal state obtained with a Maximum Power Point Tracking (MPPT) algorithm and a voltage Proportional Integral (PI) control according to the signals collected in the step S0, and the reactive current voltage outputted from the inverter is controlled to be zero. That is, the inverter is controlled to operate normally.

A control program or a controller calculates a target voltage value in the normal state as the inverter operates normally by using the MPPT algorithm according to the DC voltage signal and the DC current signal collected in the step S0, and obtain the target current value in the normal state by making a difference signal between the target voltage value in the normal state and collected the DC voltage experience a PI adjustment in a voltage loop. Because the grid is in the normal operation state and needs no reactive compensation, a power factor is 1 at this time, so that the active current value outputted by the inverter is controlled to be the target current value in the normal state, and the reactive current value is zero.

Figure 3:
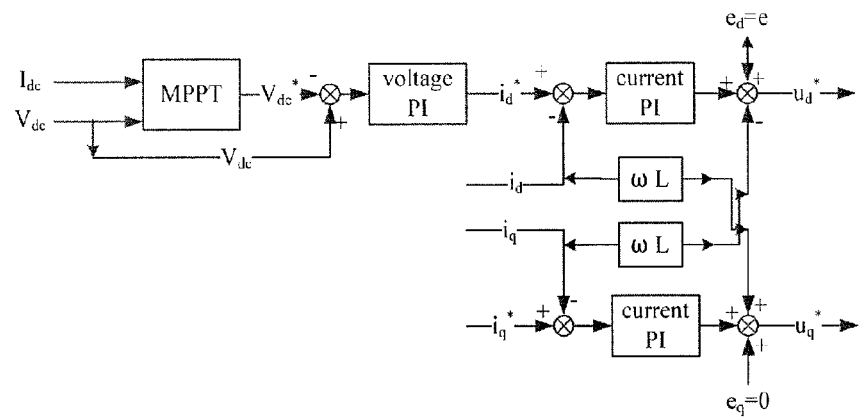
FIG. 3 is exemplary diagram illustrating solving of a target active current value in a normal state according to the embodiments of the present disclosure.

FIG. 3 illustrates an implementation for solving the target active current value in the normal state in the grid-connected photovoltaic system in the method for controlling the Low Voltage Ride Through of the photovoltaic grid-connected inverter according to the present embodiment, and this grid-connected photovoltaic system is configured by connecting a three-phase AC grid with the photovoltaic power station.

In a step 1, the current Idc at the DC side and the voltage Vdc at the DC side are inputted to a inverter control apparatus, and a voltage reference value Vdc* at the DC side is obtained by a calculation with the MPPT algorithm.

In a step 2, a reference value id* of a d-axis component (namely the active current) of the current, that is, the target active current value, is obtained by performing the PI adjustment in the voltage loop (an outer loop) on the difference signal between the voltage reference value Vdc* at the DC side and the voltage Vdc at the DC side.

In a step 3, a target voltage ud* of the d-axis is obtained by performing a PI adjustment in a current loop (an inter loop) and a cross decoupling control on a difference between the reference value id* of the d-axis component of the current and an id (which is obtained by performing a clark transform on collected currents i[ia ib ic] at the AC side).

In a step 4, when the grid is in the normal state, the output power factor of the inverter is 1, therefore the reactive current iq* is controlled to be 0, so that a target voltage uq* of a q-axis is similarly obtained by performing the PI adjustment in the current loop and the cross decoupling control on a difference between the iq* and an actual iq (which is obtained by performing the clark transform on the samples i[ia ib ic] provided by the collected signal at the AC side in the step S0).

In a step 5, PWM controlled waveforms are outputted by performing a Space Vector Pulse Width Modulation (SVPWM) control on the ud* and the uq*, and are inputted to switch devices in the DC/AC inverter so as to control the DC/AC inverter to output the target current value in the normal state (namely the i*$_d$). In FIG. 3, $e_d$ is an equivalent component of an active voltage (a voltage of the d-axis) obtained by performing the clark transform on the collected voltages of the grid at the AC; and $e_q$ is an equivalent component of a reactive voltage (a voltage of the q-axis) obtained by performing the clark transform on the collected voltage of the grid at the AC side.

When the grid operates normally, the manners for controlling the output of the inverter are various, and preferably, the present embodiment utilizes the MPPT algorithm and the voltage PI control which can realize a precise and simple control and are convenient.

As a further improvement of the present embodiment, the method for controlling the Low Voltage Ride Through of the photovoltaic grid-connected inverter according to the present embodiment further comprises a step for acquiring the target active current value and the target reactive current value in the Low Voltage Ride Through state.

The target active current value $i^*_d$ is a preset active current value $i_d'$ outputted from the inverter as the gird operates normally; the target reactive current value of the reactive power current satisfies $i'^2_d + i^{*2}_q = (ni'_d)^2$, so the target reactive current value $i^*_q$ is $i^*_q = \sqrt{(n^2-1)} \times i'_d$, wherein n is a preset variation amplitude of a total current outputted from the inverter.

A value of n may be selected depending on actual requirements in the operation of the grid, and generally n is set as 1.1, such that the fluctuation in the amplitude of the current outputted from the inverter is controlled to be within ±10% when the voltage dip occurs. With the present embodiment, the output waveform of the current is good, the variation in the amplitude is small and the output quality of the electric energy is high, as compared with the traditional method for controlling the Low Voltage Ride Through in which the control for the distortion of the current is ignored.

In the present embodiment, the inverter is controlled in a manner of a combination of the MPPT algorithm and the voltage PI control when the inverter operates normally, while the inverter is controlled in a manner of compensating the active power with the reactive power when the voltage dip occurs so that the distortion of the waveform of the current is small. Two different control manner are utilized before and after the voltage dips, therefore the outputted total current changes very little, which can perfectly support the grid. As a result, the problem that a passive splitting of the photovoltaic power supplying portion in the grid leads to a malfunction expansion in the grid and even the grid being shut down completely. The method for controlling the Low Voltage Ride Through of the photovoltaic grid-connected inverter according to the present embodiment is applicable to control for the Low Voltage Ride Through in any grid-connected photovoltaic system, and especially applicable to a large scale grid-connected photovoltaic system and a network in which the photovoltaic power supplying portion has a high penetration rate.

Embodiment 5

An apparatus for controlling a Low Voltage Ride Through of a photovoltaic grid-connected inverter according to the present embodiment comprises a control unit.

The control unit judges whether a root mean square value of a voltage in a grid is lower than an upper limit of a low voltage value. The control unit controls the inverter to operate normally when it is judged that the root mean square value of the voltage in the grid is not lower than the upper limit of the low voltage value. The control unit judges whether the root mean square value of the voltage in the grid is lower than a lower limit of the low voltage value when it is judged that the root mean square value of the voltage in the grid is lower than the upper limit of the low voltage value, controls the inverter to stop operating when it is judged that the root mean square value of the voltage in the grid is lower than the lower limit of the low voltage value, and controls an active current value outputted from the inverter to be equal to a target active current value and a reactive current value outputted from the inverter to be equal to a target reactive current value when it is judged that the root mean square value of the voltage in the grid is not lower than the lower limit of the low voltage value.

In an example, a comparison difference between a total current outputted by the inverter in a Low Voltage Ride Through state and a current outputted in a normal state is smaller than a preset value.

In the present embodiment, by configuring the control unit, the control for the active current and the reactive current outputted from the inverter is realized when the voltage dips, not only the inverter and the photovoltaic power supplying portion located at the DC side of the inverter are enabled to complete the Low Voltage Ride Through successfully, but also the inverter is ensured to output a current with small distortion and slight fluctuation in its amplitude, so that the quality of the output electric energy is good and the stability and reliability of the grid are enhanced. Therefore, the phenomena that a power cut in a large scale and a grid shut-down are caused by the splitting of the photovoltaic power supplying portion and other units because of the transient voltage dip in the power network system can be avoided. As a result, the operation of the grid can be supported perfectly.

In the present embodiment, the control unit may be a DSP control unit, a MCU control unit or a microcomputer control unit and the like. Both of the upper limit of the low voltage value and the lower limit of the low voltage value may be values preset inside the control unit, and also may be quantities inputted externally according to detailed requirements, or may be values calculated with a preset calculation model(s).

Preferably, the apparatus for controlling the Low Voltage Ride Through of the photovoltaic grid-connected inverter according to the present embodiment may further comprise a timing unit.

When the root mean square value of the voltage in the grid is lower than the upper limit of the low voltage value, the timing unit is used to time a duration during which the root mean square value of the voltage in the grid is not lower than the lower limit of the low voltage value, and the control unit judges whether the root mean square value of the voltage in the grid is equal to the lower limit of the low voltage value.

The control unit judges whether the duration reaches the T1 when the control unit judges that the root mean square value of the voltage in the grid is equal to the lower limit of the low voltage value. The inverter is controlled to stop operating when it is judged that the duration reaches the T1.

When the control unit judges that the root mean square value of the voltage in the grid is not equal to the lower limit of the low voltage value, it judges whether the duration reaches the T2. The inverter is controlled to stop operating when it is judged that the duration reaches the T2.

The configuration of the timing unit is benefit for a statistics of the Low Voltage Ride Through period, such that the inverter and the photovoltaic power supplying portion can be separated from the gird at the AC side in time, which can protect the photovoltaic power supplying portion and satisfy a specification for the inverter in the grid-connected photovoltaic system in the industry.

Embodiment 6

Figure 4:
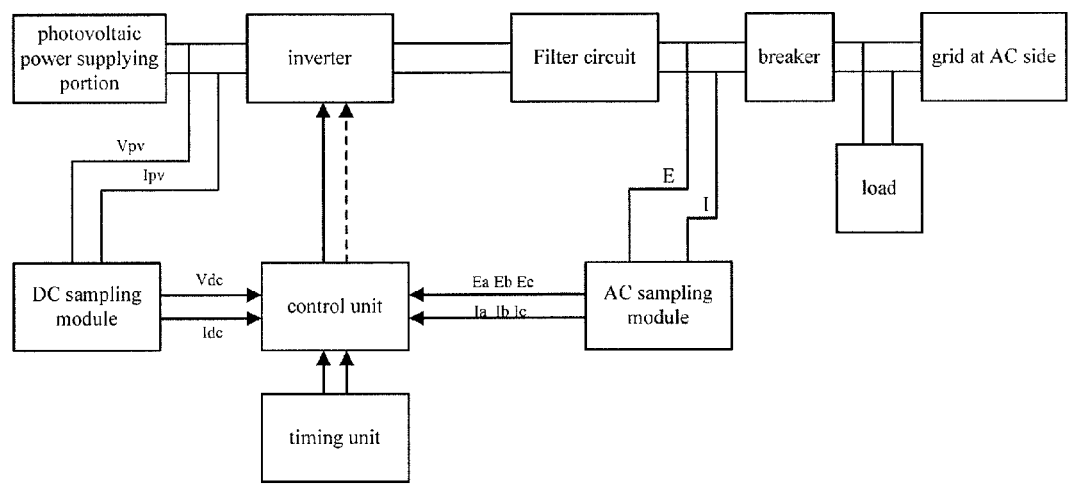
FIG. 4 is an exemplary diagram illustrating a connection structure between an apparatus for controlling the Low Voltage Ride Through of the photovoltaic grid-connected inverter and a grid-connected photovoltaic system according to the embodiments of the present disclosure.

FIG. 4 is an exemplary diagram illustrating a connection structure between an apparatus for controlling the Low Voltage Ride Through of the photovoltaic grid-connected inverter and a grid-connected photovoltaic system according to the embodiment of the present disclosure. Here, the grid-connected photovoltaic system comprises the photovoltaic power supplying portion at the DC side, the inverter for converting the DC signal from the photovoltaic power supplying portion into the AC signal, the grid and its loads connected at the AC side of the inverter via a filter circuit.

The apparatus for controlling the Low Voltage Ride Through of the photovoltaic grid-connected inverter according to the present embodiment comprises a sampling unit, a control unit and a timing unit.

The sampling unit comprises a DC sampling module for collecting a voltage signal and a current signal at the DC side and an AC sampling module for collecting voltage signals and current signals of the grid at the AC side. In an example, the DC sampling module collects a voltage signal Vpv and a current signal Ipv as illustrated in FIG. 4, and the AC sampling module collects voltage signals E and current signals I from the grid at the AC side. The grid at the AC side shown in FIG. 4 is a three-phase AC grid, so the voltage sample values of the AC side comprise three phase voltage signals Ea, Eb and Ec, while the current sample values of the AC side comprise three phase current signals Ia, Ib and Ic.

The control unit judges whether a root mean square value of a voltage in a grid is lower than an upper limit of a low voltage value. The control unit controls the inverter to operate normally when it is judged that the root mean square value of the voltage in the grid is not lower than the upper limit of the low voltage value. The control unit judges whether the root mean square value of the voltage in the grid is lower than a lower limit of the low voltage value when it is judged that the root mean square value of the voltage in the grid is lower than the upper limit of the low voltage value, controls the inverter to stop operating when it is judged that the root mean square value of the voltage in the grid is lower than the lower limit of the low voltage value, and controls an active current value outputted from the inverter to be equal to a target active current value and a reactive current value outputted from the inverter to be equal to a target reactive current value when it is judged that the root mean square value of the voltage in the grid is not lower than the lower limit of the low voltage value.

When the root mean square value of the voltage in the grid is lower than the upper limit of the low voltage value, the timing unit times a duration during which the root mean square value of the voltage in the grid is not lower than the lower limit of the low voltage value and the control unit judges whether the root mean square value of the voltage in the grid is equal to the lower limit of the low voltage value. The control unit judges whether the duration reaches the T1 when the control unit judges that the root mean square value of the voltage in the grid is equal to the lower limit of the low voltage value, and the inverter is controlled to stop operating when it is judged that the duration reaches the T1. When the control unit judges that the root mean square value of the voltage in the grid is not equal to the lower limit of the low voltage value, the control unit judges whether the duration reaches the T2 and the inverter is controlled to stop operating when it is judged that the duration reaches the T2.

In an example, the control unit comprises a normal state control module and a Low Voltage Ride Through state control module. The operation of the inverter is controlled by the PWM control waveform. In a detailed implementation process, the manners for controlling the inverter by the control unit are various, and preferably, the present embodiment utilizes the PWM control waveform which can realize a simple control and is convenient to realize the control.

When the root mean square value of the voltage in the grid is not lower than the upper limit of the low voltage value, the normal state control module controls the active current value outputted from the inverter normally to be equal to a target current value in the normal state obtained with the MPPT algorithm and the voltage PI control according to the signals collected by the sampling unit, and controls the reactive current voltage outputted from the inverter normally to be zero. Control signals issued by the normal state control module are as illustrated by an arrow with solid line from the control unit to the inverter in FIG. 4.

In an example, the control unit further comprises the Low Voltage Ride Through state control module for acquiring the target active current value and the target reactive current value in the Low Voltage Ride Through state.

The target active current value $i^*_d$ is a preset active current value $i_d'$ outputted from the inverter as the gird operate normally, the target reactive current value $i^*_q$ is $i^*_q = \sqrt{(n^2-1)} \times i'_d$, where n is a preset variation amplitude of a total current outputted from the inverter. Control signals issued by the Low Voltage Ride Through state control module are as illustrated by an arrow with dotted line from the control unit to the inverter in FIG. 4.

The target active current value may be a value preset in a storage unit inside the apparatus for controlling, also may be a value collected by the sampling unit, and further may be a value solved based on statistics, while the target reactive current value is a value solved according to requirements for the compensation. The value of n may be determined according to the requirements of the gird and an allowable range for the waveform distortion. Generally, the value of n is 1.1, and preferably n is larger than or equal to 0.8 and smaller than or equal to 1.2.

In the method and apparatus for controlling the Low Voltage Ride Through of the photovoltaic grid-connected inverter according to the embodiments of the present disclosure, the controlling to the inverter is divided into a control in the normal state and a control in the Low Voltage Ride Through state, the waveform and amplitude of the current outputted from the inverter in the Low Voltage Ride Through state are ensured to have no big difference from those of the current outputted from the inverter in the normal state by using two different control manners, so that the grid is stable and reliable in the Low Voltage Ride Through state. Especially, in the Low Voltage Ride Through state, the apparatus for controlling according to the embodiments of the present disclosure ensures the variations in the waveform and amplitude of the total current outputted from the inverter to be within a preset range in a manner of reaction compensation, thus an object for stabilizing the grid is realized while the implementations according to the embodiments of the present disclosure have perfect effects and are realized simply.

Above implementations are only illustrative implementations utilized for explaining the principle of the present disclosure, instead of limiting the present disclosure. For those ordinary skilled in the art, many variations or improvements may be made without departing from the spirit and scope of the present disclosure, and all of equivalent solutions should fall into the protection scope of the present disclosure defined by claims.

What is claimed is:

1. A method for controlling a Low Voltage Ride Through of a photovoltaic grid-connected inverter, comprising steps of:

judging whether a root mean square value of a voltage in a grid is lower than an upper limit of a low voltage value;

controlling the inverter to operate in a normal state when it is judged that the root mean square value of the voltage in the grid is not lower than the upper limit of the low voltage value, wherein an active current value outputted from the inverter in the normal state is controlled to be a target active current value outputted from the inverter in the normal state and a reactive current value outputted from the inverter in the normal state is controlled to be zero; and judging whether the root mean square value of the voltage in the grid is lower than a lower limit of the low voltage value when it is judged that the root mean square value of the voltage in the grid is lower than the upper limit of the low voltage, controlling the inverter to stop operating when it is judged that the root mean square value of the voltage in the grid is lower than the lower limit of the low voltage value, and controlling an active current value outputted from the inverter to be equal to the target active current value in the normal state and a reactive current value outputted from the inverter to be equal to a target reactive current value when it is judged that the root mean square value of the voltage in the grid is not lower than the lower limit of the low voltage value, wherein the target reactive current value is determined by a preset fluctuation range of the amplitude of a total current outputted by the inverter and the target active current value in the normal state, such that the fluctuation of the amplitude of the total current outputted by the inverter in a Low Voltage Ride Through state relative to the current outputted in the normal state is within the preset fluctuation range.

2. The method for controlling the Low Voltage Ride Through of the photovoltaic grid-connected inverter of claim 1, further comprising:

timing a duration during which the root mean square value of the voltage in the grid is not lower than the lower limit of the low voltage value and judging whether the root mean square value of the voltage in the grid is equal to the lower limit of the low voltage value, when it is judged that the root mean square value of the voltage in the grid is lower than the upper limit of the low voltage value;

judging whether the duration reaches a preset period of time T1 when it is judged that the root mean square value of the voltage in the grid is equal to the lower limit of the low voltage value, controlling the inverter to stop operating when it is judged that the duration reaches the preset period of time T1, and controlling the active current value outputted from the inverter to be equal to the target active current value and the reactive current value outputted from the inverter to be equal to the target reactive current value when it is judged that the duration does not reach the preset period of time T1; and judging whether the duration reaches a preset period of time T2 when it is judged that the root mean square value of the voltage in the grid is not equal to the lower limit of the low voltage value, controlling the inverter to stop operating when it is judged that the duration reaches the preset period of time T2, and controlling the active current value outputted from the inverter to be equal to the target active current value and the reactive current value outputted from the inverter to be equal to the target reactive current value when it is judged that the duration does not reach the preset period of time T2.

3. The method for controlling the Low Voltage Ride Through of the photovoltaic grid-connected inverter of claim 2, further comprising: collecting a voltage signal and a current signal at a DC side and collecting voltage signals and current signals of the grid at an AC side, wherein when it is judged that the root mean square value of the voltage in the grid is not lower than the upper limit of the low voltage value, the active current value outputted from the inverter normally is controlled to be equal to a target current value in the normal state obtained with a MPPT algorithm and a voltage PI control according to the collected signals, and the reactive current voltage outputted from the inverter is controlled to be zero.

4. The method for controlling the Low Voltage Ride Through of the photovoltaic grid-connected inverter of claim 2, further comprising: acquiring the target active current value and the target reactive current value in the Low Voltage Ride Through state, wherein the target active current value $i^*_d$ is a preset active current value $i_d'$ outputted from the inverter as the gird operates normally, the target reactive current value $i^*_q$ is $i^*_q = \sqrt{(n^2-1)} \times i'_d$, wherein n is a preset variation amplitude of a total current outputted from the inverter.

5. The method for controlling the Low Voltage Ride Through of the photovoltaic grid-connected inverter of claim 1, further comprising: collecting a voltage signal and a current signal at a DC side and collecting voltage signals and current signals of the grid at an AC side, wherein when it is judged that the root mean square value of the voltage in the grid is not lower than the upper limit of the low voltage value, the active current value outputted from the inverter normally is controlled to be equal to a target current value in the normal state obtained with a MPPT algorithm and a voltage PI control according to the collected signals, and the reactive current voltage outputted from the inverter is controlled to be zero.

6. The method for controlling the Low Voltage Ride Through of the photovoltaic grid-connected inverter of claim 1, further comprising: acquiring the target active current value and the target reactive current value in the Low Voltage Ride Through state, wherein the target active current value $i^*_d$ is a preset active current value $i_d'$ outputted from the inverter as the gird operates normally, the target reactive current value $i^*_q$ is $i^*_q = \sqrt{(n^2-1)} \times i'_d$, wherein n is a preset variation amplitude of a total current outputted from the inverter.

7. An apparatus for controlling a Low Voltage Ride Through of a photovoltaic grid-connected inverter, comprising a control unit; wherein the control unit judges whether a root mean square value of a voltage in a grid is lower than an upper limit of a low voltage value;

the control unit controls the inverter to operate in a normal state when it is judged that the root mean square value of the voltage in the grid is not lower than the upper limit of the low voltage value, wherein an active current value outputted from the inverter in the normal state is controlled to be a target active current value outputted from the inverter in the normal state and a reactive current value outputted from the inverter in the normal state is controlled to be zero; and the control unit judges whether the root mean square value of the voltage in the grid is lower than a lower limit of the low voltage value when it is judged that the root mean square value of the voltage in the grid is lower than the upper limit of the low voltage value, controls the inverter to stop operating when it is judged that the root mean square value of the voltage in the grid is lower than the lower limit of the low voltage value, and controls an active current value outputted from the inverter to be equal to the target active current value in the normal state and a reactive current value outputted from the inverter to be equal to a target reactive current value when it is judged that the root mean square value of the voltage in the grid is not lower than the lower limit of the low voltage value, wherein the target reactive current value is determined by a preset fluctuation range of the amplitude of a total current outputted by the inverter and the target active current value in the normal state, and such that the fluctuation of the amplitude of the total current outputted by the inverter in a Low Voltage Ride Through state relative to the current outputted in the normal state is within the preset fluctuation range.

8. The apparatus for controlling the Low Voltage Ride Through of the photovoltaic grid-connected inverter of claim 7, further comprising a timing unit; wherein when it is judged that the root mean square value of the voltage in the grid is lower than the upper limit of the low voltage value, the timing unit times a duration during which the root mean square value of the voltage in the grid is not lower than the lower limit of the low voltage value, and the control unit judges whether the root mean square value of the voltage in the grid is equal to the lower limit of the low voltage value;

the control unit judges whether the duration reaches a preset period of time T1 when it is judged that the root mean square value of the voltage in the grid is equal to the lower limit of the low voltage value, controls the inverter to stop operating when it is judged that the duration reaches the preset period of time T1, and controls the active current value outputted from the inverter to be equal to the target active current value and the reactive current value outputted from the inverter to be equal to the target reactive current value when it is judged that the duration does not reach the preset period of time T1; and the control unit judges whether the duration reaches a preset period of time T2 when it is judged that the root mean square value of the voltage in the grid is not equal to the lower limit of the low voltage value, controls the inverter to stop operating when it is judged that the duration reaches the preset period of time T2, and controls the active current value outputted from the inverter to be equal to the target active current value and the reactive current value outputted from the inverter to be equal to the target reactive current value when it is judged that the duration does not reach the preset period of time T2.

9. The apparatus for controlling the Low Voltage Ride Through of the photovoltaic grid-connected inverter of claim 8, further comprising a sampling unit, wherein the sampling unit comprises a DC sampling module for collecting a voltage signal and a current signal at a DC side and an AC sampling module for collecting voltage signals and current signals of the grid at an AC side, wherein the control unit comprises a normal state control module, and when the root mean square value of the voltage in the grid is not lower than the upper limit of the low voltage value, the normal state control module controls the active current value outputted from the inverter normally to be equal to a target current value in the normal state obtained with a MPPT algorithm and a voltage PI control according to the collected signals and controls the reactive current voltage outputted from the inverter to be zero.

10. The apparatus for controlling the Low Voltage Ride Through of the photovoltaic grid-connected inverter of claim 8, further comprising a Low Voltage Ride Through state control module for acquiring the target active current value and the target reactive current value in the Low Voltage Ride Through state, the target active current value $i^*_d$ is a preset active current value $i_d'$ outputted from the inverter as the gird operates normally, the target reactive current value $i^*_q$ is $i^*_q = \sqrt{(n^2-1)} \times i'_d$, wherein n is a preset variation amplitude of a total current outputted from the inverter.

11. The apparatus for controlling the Low Voltage Ride Through of the photovoltaic grid-connected inverter of claim 7, further comprising a sampling unit, wherein the sampling unit comprises a DC sampling module for collecting a voltage signal and a current signal at a DC side and an AC sampling module for collecting voltage signals and current signals of the grid at an AC side, wherein the control unit comprises a normal state control module, and when the root mean square value of the voltage in the grid is not lower than the upper limit of the low voltage value, the normal state control module controls the active current value outputted from the inverter normally to be equal to a target current value in the normal state obtained with a MPPT algorithm and a voltage PI control according to the collected signals and controls the reactive current voltage outputted from the inverter to be zero.

12. The apparatus for controlling the Low Voltage Ride Through of the photovoltaic grid-connected inverter of claim 7, further comprising a Low Voltage Ride Through state control module for acquiring the target active current value and the target reactive current value in the Low Voltage Ride Through state, the target active current value $i^*_d$ is a preset active current value $i_d'$ outputted from the inverter as the gird operates normally, the target reactive current value $i^*_q$ is $i^*_q = \sqrt{(n^2-1)} \times i'_d$, wherein n is a preset variation amplitude of a total current outputted from the inverter.

* * * * *